US009264511B2

(12) United States Patent
Li et al.

(10) Patent No.: US 9,264,511 B2
(45) Date of Patent: *Feb. 16, 2016

(54) CONTENT SHARING AMONG MOBILE TERMINALS

(71) Applicant: International Business Machines Corporation, Armonk, NY (US)

(72) Inventors: Li Li, Beijing (CN); Yonghua Lin, Beijing (CN); Rui Xiong Tian, Beijing (CN); Qing Wang, Beijing (CN); Yi Xin Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/830,323

(22) Filed: Aug. 19, 2015

(65) Prior Publication Data
US 2015/0358422 A1 Dec. 10, 2015

Related U.S. Application Data

(63) Continuation of application No. 13/976,880, filed as application No. PCT/EP2011/072808 on Dec. 14, 2011, now Pat. No. 9,154,997.

(30) Foreign Application Priority Data

Dec. 30, 2010 (CN) .......................... 2010 1 0613133

(51) Int. Cl.
*H04W 72/00* (2009.01)
*H04L 29/08* (2006.01)
(Continued)

(52) U.S. Cl.
CPC ........ *H04L 67/2857* (2013.01); *H04L 61/1582* (2013.01); *H04W 4/023* (2013.01); *H04W 24/10* (2013.01)

(58) Field of Classification Search
CPC ... H04L 61/10; H04L 67/2804; H04W 28/16; H04W 4/206
USPC .................. 455/450, 550.1, 556.2, 420–422.1
See application file for complete search history.

(56) References Cited

U.S. PATENT DOCUMENTS

| 8,406,206 B2* | 3/2013 | Chiang | ............... H04W 88/182 370/338 |
| 2006/0059248 A1* | 3/2006 | Ikeda | ..................... H04L 67/104 709/219 |

(Continued)

FOREIGN PATENT DOCUMENTS

| CN | 1249571 A | 4/2000 |
| CN | 1549540 A | 11/2004 |

(Continued)

OTHER PUBLICATIONS

Tang et al., "Analysis of TTL-Based Consistency in Unstructured Peer-to-Peer Networks", IEEE Transactions on Parallel and Distributed Systems, vol. 19, No. 12, Dec. 2008. pp. 1683-1964.
Lee et al., "Load Mitigation in Cellular Data Networks by Peer Data Sharing Over WLAN Channels", Computer Networks, Elsevier Science Publishers B.V., Amsterdam, NL, vol. 47, No. 2, Feb. 4, 2005, pp. 271-286.

(Continued)

*Primary Examiner* — Babar Sarwar
(74) *Attorney, Agent, or Firm* — Scully, Scott, Murphy & Presser, P.C.; Jennifer Davis, Esq.

(57) ABSTRACT

A method for realizing content sharing among mobile terminals comprises: receiving an index of access content sent by a requesting mobile terminal; looking up a shareable content index table for the index of the access content; and sending identification information of a mobile terminal having the index of the access content to the requesting mobile terminal if the index of the access content is found, so that the requesting mobile terminal obtains the requested access content from the mobile terminal having the index of the access content via wireless communication.

16 Claims, 6 Drawing Sheets

(51) Int. Cl.
*H04L 29/12* (2006.01)
*H04W 4/02* (2009.01)
*H04W 24/10* (2009.01)

(56) References Cited

U.S. PATENT DOCUMENTS

| | | | |
|---|---|---|---|
| 2008/0120369 A1* | 5/2008 | Gustavsson | H04L 67/1095 709/204 |
| 2008/0250024 A1* | 10/2008 | Kvm | G06F 17/30132 |
| 2008/0276091 A1* | 11/2008 | Welin | H04L 67/104 713/170 |
| 2009/0009347 A1 | 1/2009 | Kaelin et al. | |
| 2009/0046677 A1* | 2/2009 | Toledano | H04L 12/5895 370/338 |
| 2010/0138552 A1* | 6/2010 | Oh | H04L 67/104 709/229 |
| 2010/0215024 A1 | 8/2010 | Chiang | |
| 2010/0238840 A1 | 9/2010 | Lu et al. | |

FOREIGN PATENT DOCUMENTS

| | | |
|---|---|---|
| CN | 100499463 C | 6/2009 |
| CN | 101827131 A | 4/2014 |
| EP | 2 200 248 A1 | 6/2010 |
| JP | 2005-149040 A | 6/2005 |
| JP | 2006-072432 A | 3/2006 |
| JP | 2007-158478 A | 6/2007 |
| JP | 2010-200305 A | 9/2010 |
| WO | WO 2008/135304 A1 | 11/2008 |
| WO | WO 2010/053860 A2 | 5/2010 |

OTHER PUBLICATIONS

Mauder et al., "Creating and sharing multi-media packages using large situated public displays and mobile phones", 9th International Conference on Human Computer Interaction with Mobile Devices and Services, Singapore, Sep. 11-14, 2007, pp. 1-4.
International Search Report and Written Opinion, PCT/EP2011/072808.

* cited by examiner

CONTENT SHARING AMONG MOBILE TERMINALS

CROSS REFERENCE TO RELATED APPLICATION

This application is a continuation of U.S. patent application Ser. No. 13/976,880 filed Oct. 16, 2013, the entire content and disclosure of which is incorporated herein by reference.

TECHNICAL FIELD

The present invention relates to mobile terminals, and more specifically, to a method and an apparatus for content sharing among mobile terminals.

BACKGROUND

Global mobile internet has entered into an explosively increasing stage. Till now the user number of China Mobile becomes more than half a billion. However, traditional telecommunication operators face a dilemma: 3G wireless data traffic is sharply increased, while a bandwidth bottleneck gradually emerges. Users also have increasing requirements for mobile data content services comprising digital multimedia content services and content services of websites. In order to make effort to satisfy such increasing requirements for mobile data content services from the users, networks and frequency spectrums of most operators run at full capacity.

Figure 1:
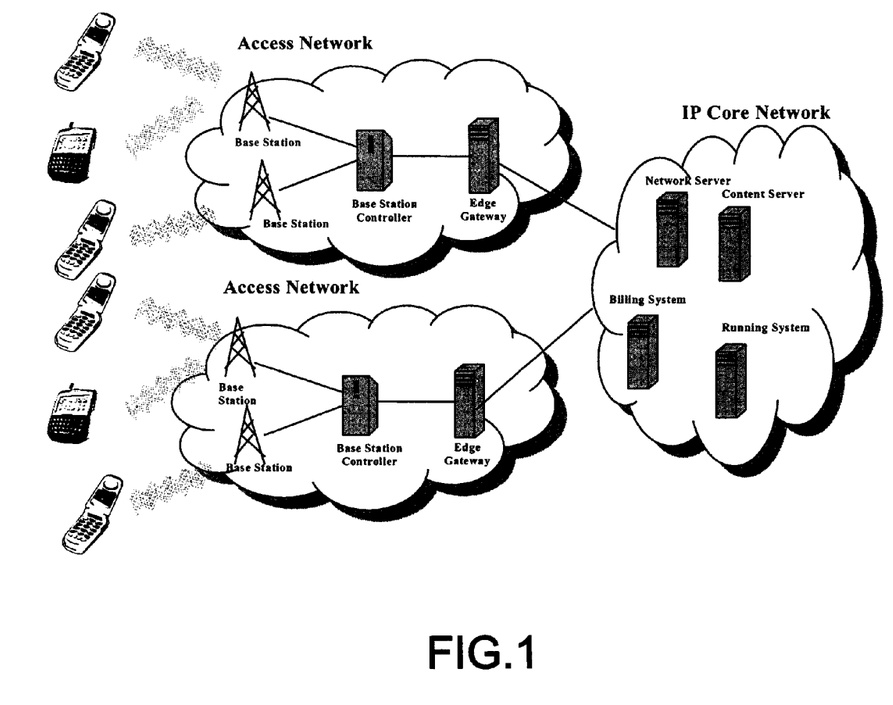
FIG. 1 shows a schematic view of requesting to obtain content services by communication among mobile terminals and base stations in a cell in the prior art.

FIG. 1 shows a schematic view of requesting to obtain content services by communication among mobile terminals and base stations in a cell in the prior art. In order to acquire data content services, a mobile user needs to communicate with a base station via an Air Interface. The "Air Interface" represents a wireless transmission specification between a base station and a mobile phone, and defines the use frequency and bandwidth of each wireless channel and the employed coding method. After receiving a request from a mobile terminal, the base station obtains content to which the mobile user requests to access from a network server and a content server in an IP core network via a wired network, and sends it to the mobile terminal through the Air Interface.

With the increasing of the number of mobile users, the wireless spectrum resources of the Air Interfaces are increasingly limited so that the quality of data content services obtained by the mobile users is degraded, and the user experience is deteriorated.

Thus, how to sufficiently increase the utilization of the spectrum in the case of current spectrum resources is very important and valuable for dealing with crisis of spectrum resources and enhancing the experiences of mobile users.

SUMMARY

Based on the above problems, the present invention provides a method and an apparatus for realizing content sharing among mobile terminals.

According to a first aspect of the present invention, a method for realizing content sharing among mobile terminals is provided, which comprises the steps of: receiving an index of access content sent by a requesting mobile terminal; looking up a shareable content index table for the index of the access content; and sending identification information of a mobile terminal having the index of the access content to the requesting mobile terminal if the index of the access content is found, so that the requesting mobile terminal obtains the requested access content from the mobile terminal having the index of the access content via wireless communication.

According to a second aspect of the present invention, a method for realizing content sharing among mobile terminals is provided, which comprises the steps of: intercepting an access content request transmitted via an application from a user; generating an index of access content according to the intercepted access content request; looking up local content index table for the index of the access content; and sending the index of the access content to a base station if the index of the access content is not found.

According to a third aspect of the present invention, an apparatus for realizing content sharing among mobile terminals is provided, which comprises: an index receiving module configured to receive an index of access content transmitted from a mobile terminal that requests to access content; an index lookup module configured to look up a shareable content index table for the index of the access content; and an identification information sending module configured to send identification information of a mobile terminal having the index of the access content to the requesting mobile terminal if the index of the access content is found, so that the requesting mobile terminal obtains the requested content from the mobile terminal having the index of the access content via wireless communication.

According to a fourth aspect of the present invention, an apparatus for realizing content sharing among mobile terminals, which comprises: a content request interception module configured to intercept an access content request transmitted via an application from a user; an index generation module configured to generate an index of access content according to the intercepted access content request; an index lookup module configured to look up a local content index table for the index of the access content; and an index sending module configured to send the index of the access content to a base station if the index of the access content is not found.

By using the coordinating ability of a base station, transmission and distribution of data content are coordinated among mobile terminals through personal local area networks, thereby saving the spectrum resources of Air Interface, and providing better user experiences to mobile users.

BRIEF DESCRIPTION OF THE DRAWINGS

Embodiments of the invention will now be described, by way of example only, with reference to the accompanying drawings in which.

DETAILED DESCRIPTION

Hereinafter, a method and a system for realizing content sharing among mobile terminals according to embodiments of the present invention are described in conjunction with the attached drawings, so that the objects and advantages of the present invention will be better understood.

The key idea of the present invention is as follows: in crowded places such as subway, office building, a large number of mobile phone users acquire information through mobile phones anywhere anytime; when a mobile user requests to enjoy a surfing service or a content service of digital multimedia through a mobile terminal, the base station does not need to acquire digital content from the back-end by the Air Interface, instead, the base station queries, in a shareable content index table maintained by the base station, whether other mobile terminal that can provide the content service in a manner of wireless communication exists; if such a mobile terminal exists, identification information of the mobile terminal satisfying the requirement is sent to the mobile user, and the mobile user further acquires the requested content from the other mobile terminal via wireless communication, thereby saving frequency resources of Air Interface.

Figure 2:
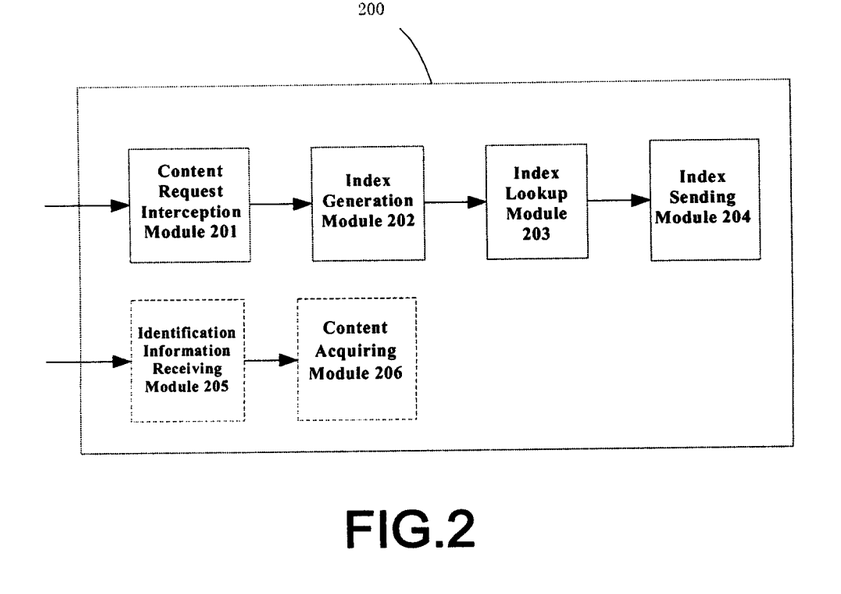
FIG. 2 shows a content sharing apparatus 200 introduced in a mobile terminal according to one embodiment of the present invention.

FIG. 2 shows a content sharing apparatus 200 introduced in a mobile terminal according to one embodiment of the present invention, which comprises a content request interception module 201 configured to intercept an access content request transmitted via an application from a user, an index generation module 202 configured to generate an index of the access content according to the received access content request, an index lookup module 203 configured to look up the local content index table for the index of the access content, and an index sending module 204 configured to send the index of the access content to a base station if the index of the access content is not found.

The content sharing apparatus according to the embodiment of the present invention can interface with various applications such as browser, multimedia player or the like. A user inputs a content request through an application of a mobile terminal. According to one embodiment of the present invention, the user requests to access a webpage by inputting a Unified Resource Locator (URL) through a browser. The content request interception module 201 intercepts the URL transmitted through the application by the user, and the content index generation module 202 generates an index uniquely identifying the URL according to the received URL. According to one embodiment of the present invention, the index uniquely identifying the URL can be generated by using a Hash function. The index lookup module 203 looks up the local content index table for the index of the URL. Each of the mobile terminals that participating in the content sharing service maintains a content index table locally, for recording the indexes generated according to the local cached contents. If the index of the URL is found in the local content index table, the content in the local cache, which is identified by the index, is directly accessed. If the index of the URL is not found in the local content index table, the index sending module 204 sends the index to a base station through Air Interface. The index can be transmitted by GPRS protocol for GSM, or by CDMA for 3G.

Further, the content sharing apparatus 200 according to the embodiment of the present invention further includes an identification information receiving module 205 configured to receive identification information of a mobile terminal having the index of the access content from a base station, and a content acquiring module 206 configured to obtain the requested content from the mobile terminal having the index of the access content via wireless communication using the identification information.

The identification information receiving module 205 receives the identification information of the mobile terminal having the index from a base station, and the content acquiring module 206 is configured to obtain the requested content from the mobile terminal having the index of the access content via wireless communication, such as accessing a nearby mobile terminal via bluetooth, by using the identification information. The content sharing apparatus of mobile terminal according to the embodiment of the present invention can be implemented in the mobile terminal in the form of a plug-in, or can be integrated into the mobile terminal as an independent software module. The content sharing apparatus is transparent not only with respect to the applications in an upper layer, but also with respect to the transmission layer and the physical layer in a lower layer, without the need to change the existing hardware configuration and transmission protocols. The content acquiring module 206 is further configured to add the index of the access content to the local content index table.

The content sharing apparatus 200 of the embodiment of the present invention further includes a wireless status reporting module configured to periodically report a wireless apparatus status, including at least power consumption status and load status, of the mobile terminal to a base station.

Figure 3:
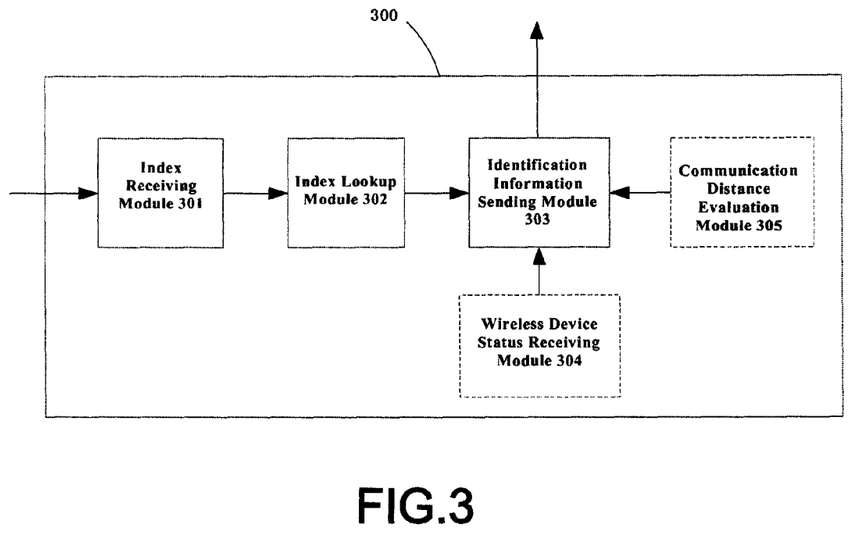
FIG. 3 shows an apparatus 300 for realizing content sharing among mobile terminals introduced at the base station side according to one embodiment of the present invention.

Corresponding to the content sharing apparatus of the mobile terminal, FIG. 3 shows an apparatus 300 for realizing content sharing among mobile terminals introduced at the base station side according to one embodiment of the present invention, which includes an index receiving module 301 configured to receive the index of access content transmitted from a requesting mobile terminal, an index lookup module 302 configured to look up a shareable content index table for the index of the access content, and an identification information sending module 303 configured to send identification information of the mobile terminal having the index of the access content to the requesting mobile terminal if the index of the access content is found, so that the requesting mobile terminal obtains the requested access content from the mobile terminal having the index of the access content via wireless communication. The apparatus for content sharing among mobile terminals at a base side can be implemented in the form of a plug-in, or be integrated into the base station as an independent software module.

If a mobile terminal in a cell requests to access content such as webpage, multimedia or the like through a browser, a multimedia player or the like, the mobile terminal generates an index of access content according to the content access request transmitted via an application by the user, and transmits the index of access content to a base station via Air Interface, which is received by the index receiving module 301 of the apparatus for realizing content sharing among mobile terminals at the base station side.

According to one embodiment of the present invention, the index receiving module 301 is further configured to periodically receive indexes of local cache content reported from mobile terminals in the cell, and to combine the received indexes of local cache content to generate a shareable content index table. The base station is responsible for maintaining the shareable content index table, including timely adding or deleting indexes of local cache contents of mobile terminals recorded in the shareable content index table, according to the indexes of local cache content lastly reported from the mobile terminals.

The index lookup module 302 is used to look up the shareable content index table for the index of access content. If the index of the access content is not found, the base station acquires content from the existing communication links, that is, to link to a mobile switch or a data switching device such as SGGN, PDSN or the like via a wire or wireless manner so as to enter into the back-bone network of the operator, and then link to Internet through a gateway of the operator. If the index of the access content is found, identification information of nearby mobile terminals having the index of the access content is sent to the mobile terminal.

According to one embodiment of the present invention, a wireless device status receiving module 304 is further included, which is configured to receive wireless device status, including whether Bluetooth or infrared data transmission is supported, power consumption and load, reported from mobile terminals in the cell. The identification information sending module 303 is further configured to query the wireless device status of the mobile terminal having the index of the access content if the index of the access content is found, and to send identification information of the mobile terminal whose wireless device status satisfies requirements of wireless communication, to the requesting mobile terminal.

According to one embodiment of the present invention, the wireless device status receiving module 304 is further configured to periodically receive power consumption status reported from mobile terminals in the cell, wherein the power consumption status can include total electricity amount, remaining electricity amount of the power source and transmitting power. The identification information sending module 303 is further configured to decide whether the power consumption status of the mobile terminals having the index of the access content satisfies power consumption requirement for wirelessly communicating with the requesting mobile terminal if the index of the access content is found, and if the power consumption status of the mobile terminal having the index of the access content does not satisfy the power consumption requirement for wirelessly communicating with the requesting mobile terminal, the access content requested by the requesting mobile terminal is still acquired through existing communication links. If the power consumption status of the mobile terminal having the index of the access content can satisfy the power consumption requirement for wirelessly communicating with the requesting mobile terminal, the identification information of the mobile terminal having the index of the access content is sent to the requesting mobile terminal.

According to one embodiment of the present invention, the wireless device status receiving module 304 is further configured to periodically receive load status, including status in which content sharing services are currently provided to other mobile terminals, reported from mobile terminals in the cell. The identification information sending module 303 is further configured to query load status of the mobile terminals having the index of the access content in a current time period if the index of the access content is found, determine the mobile terminal having the index of the access content and having a relatively lower load in the current time period, and send the identification information of the mobile terminal having the index of the access content and having a relatively lower load to the requesting mobile terminal.

According to one embodiment of the present invention, a communication distance evaluation module 305 is further included, which is configured to evaluate whether a distance between the mobile terminal having the index of the access content and the requesting mobile terminal satisfies the distance requirement for wireless communication, if the index of the access content is found. According to one embodiment of the present invention, position information such as longitude and latitude coordinates of the mobile terminal having the index of the access content and the requesting mobile terminal are to be acquired at first, and then the distance between the mobile terminal having the index of the access content and the requesting mobile terminal is calculated by using the acquired position information, to further evaluate whether the distance between the mobile terminal having the index of the access content and the requesting mobile terminal satisfies the distance requirement for wireless communication. For example, the communication distance via Bluetooth needs to be within 10 m, and the communication distance via infrared ray needs to be 0-1 m. If the distance between the mobile terminal having the index of the access content and the requesting mobile terminal does not satisfy the distance requirement for wireless communication, the base station still obtains access content requested by the requesting mobile terminal via the existing communication links. If the distance between the mobile terminal having the index of the access content and the requesting mobile terminal satisfies the distance requirement for wireless communication, the identification information sending module 303 send the identification information of the mobile terminal having the index of the access content and satisfying the distance requirement, to the requesting mobile terminal. The mobile terminal requesting to access content further obtains the requested access content from the mobile terminal having the index of the access content by wireless communication means such as Bluetooth.

Figure 4:
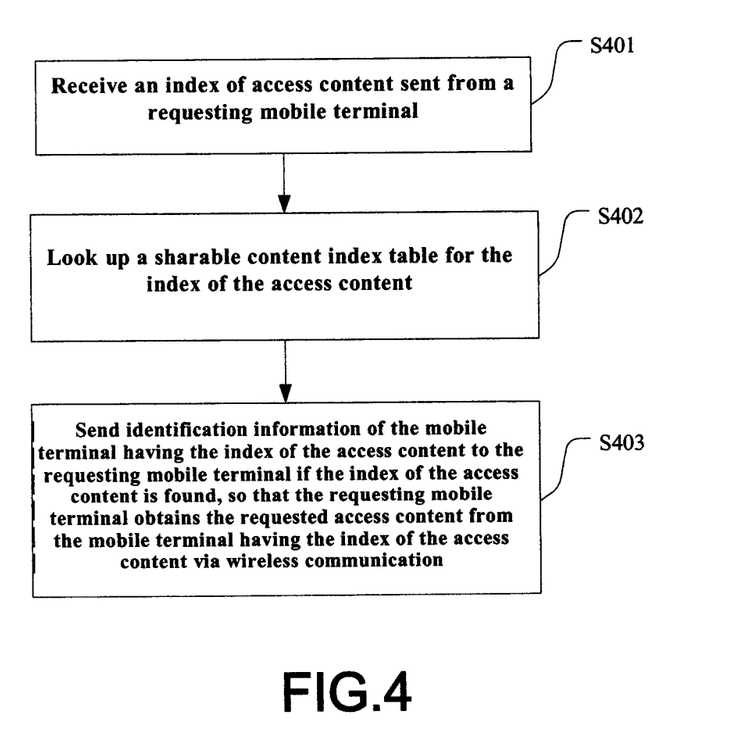
FIG. 4 shows a method for realizing content sharing among mobile terminals at the base station side according to an embodiment of the present invention.

Based on the same inventive concept, the present invention proposes a method for realizing content sharing among mobile terminals at the base station side. FIG. 4 shows a method for realizing content sharing among mobile terminals at the base station side according to an embodiment of the present invention, the method includes: at step S401, receiving an index of access content sent from a requesting mobile terminal; at step S402, looking up the shareable content index table for the index of the access content; and at step S403, sending identification information of the mobile terminal having the index of the access content to the requesting mobile terminal if the index of the access content is found, so that the requesting mobile terminal obtains the requested access content from the mobile terminal having the index of the access content via wireless communication.

The method according to the embodiment of the present invention further includes periodically receiving indexes of local cache content reported from mobile terminals in a cell, and combining the received indexes of local cache content to generate a shareable content index table.

According to one embodiment of the present invention, the method further includes receiving wireless device status reported from mobile terminals in the cell. The step of sending identification information of the mobile terminal having the index of the access content to the requesting mobile terminal if the index of the access content is found further includes: querying wireless device status of the mobile terminals having the index of the access content if the index of the access content is found; and sending the identification information of the mobile terminal whose wireless device status satisfies requirement for wireless communication, to the requesting mobile terminal.

According to one embodiment of the present invention, the step of receiving wireless device status reported from mobile terminals in the cell further includes: periodically receiving power consumption status reported from mobile terminals in the cell. The step of sending identification information of the mobile terminal having the index of the access content to the requesting mobile terminal if the index of the access content is found further includes: evaluating whether power consumption status of the mobile terminal having the index of the access content satisfies power consumption requirement for wirelessly communicating with the requesting mobile terminal if the index of the access content is found; and sending identification information of the mobile terminal having the index of the access content and satisfying the power consumption requirement, to the requesting mobile terminal.

According to one embodiment of the present invention, the step of receiving wireless device status reported from mobile terminals in the cell further includes: periodically receiving load status reported from mobile terminals in the cell. The step of sending identification information of the mobile terminal having the index of the access content to the requesting mobile terminal if the index of the access content is found further includes: querying load status of the mobile terminals having the index of the access content in a current time period if the index of the access content is found; determining the mobile terminal having the index of the access content and having a relatively lower load in the current time period; and sending identification information of the mobile terminal having the index of the access content and having a relatively lower load to the requesting mobile terminal.

According to one embodiment of the present invention, if the index of the access content is found, it is evaluated whether the distance between the mobile terminal having the index of the access content and the requesting mobile terminal satisfies the distance requirement for wireless communication; and identification information of the mobile terminal having the index of the access content and satisfying the distance requirement is sent to the requesting mobile terminal.

Figure 5:
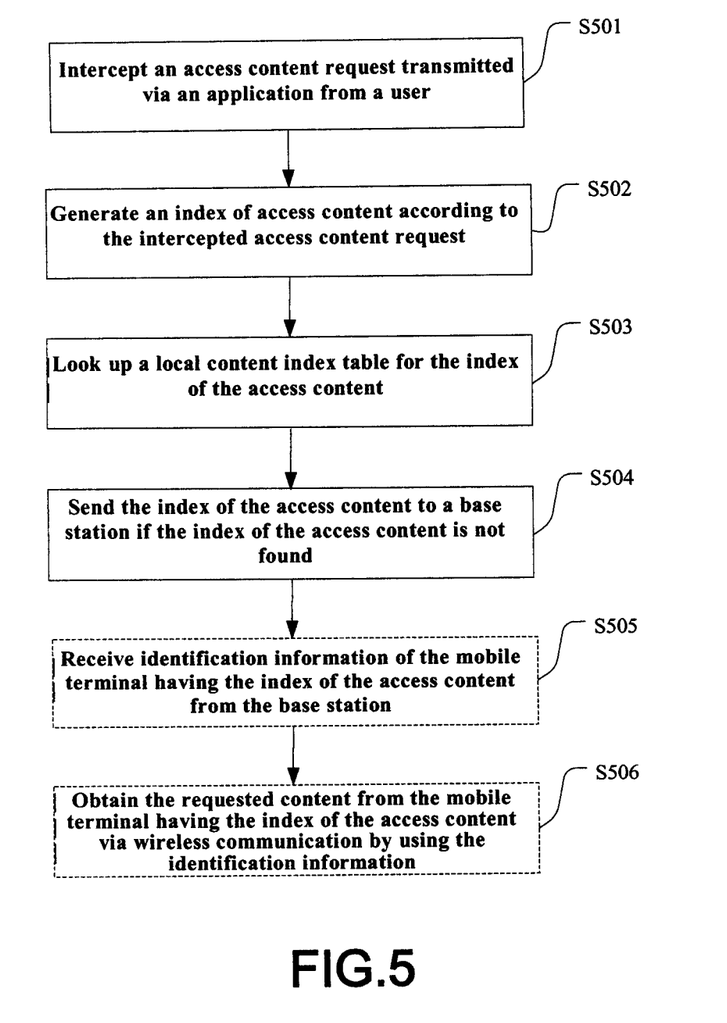
FIG. 5 shows a method for realizing content sharing among mobile terminals at the mobile terminal side according to an embodiment of the present invention.

Corresponding to the above method for realizing content sharing among mobile terminals at the base station side, FIG. 5 shows a method for realizing content sharing among mobile terminals at the mobile terminal side according to an embodiment of the present invention, the method includes the steps of: intercepting an access content request transmitted via an application from a user at step S501; generating an index of access content according to the intercepted access content request at step S502; looking up local content index table for the index of the access content at step S503; and sending the index of the access content to a base station if the index of the access content is not found, at step S504.

According to the above description on the base station side, if looking up the shareable content index tables maintained at the base station side for the index of the access content, the method at the mobile terminal further includes: receiving identification information of the mobile terminal having the index of the access content from the base station at step S505; and obtaining the requested content from the mobile terminal having the index of the access content via wireless communication by using the identification information at step S506.

In the method according to the embodiment of the present invention, the step of obtaining the requested content from the mobile terminal having the index of the access content via wireless communication by using the identification information further includes: adding the index of the access content to the local content index table.

The method according to the embodiment of the present invention further includes: periodically reporting wireless device status of mobile terminal to the base station, wherein the wireless device status includes at least one of power consumption status and load status.

Figure 6:
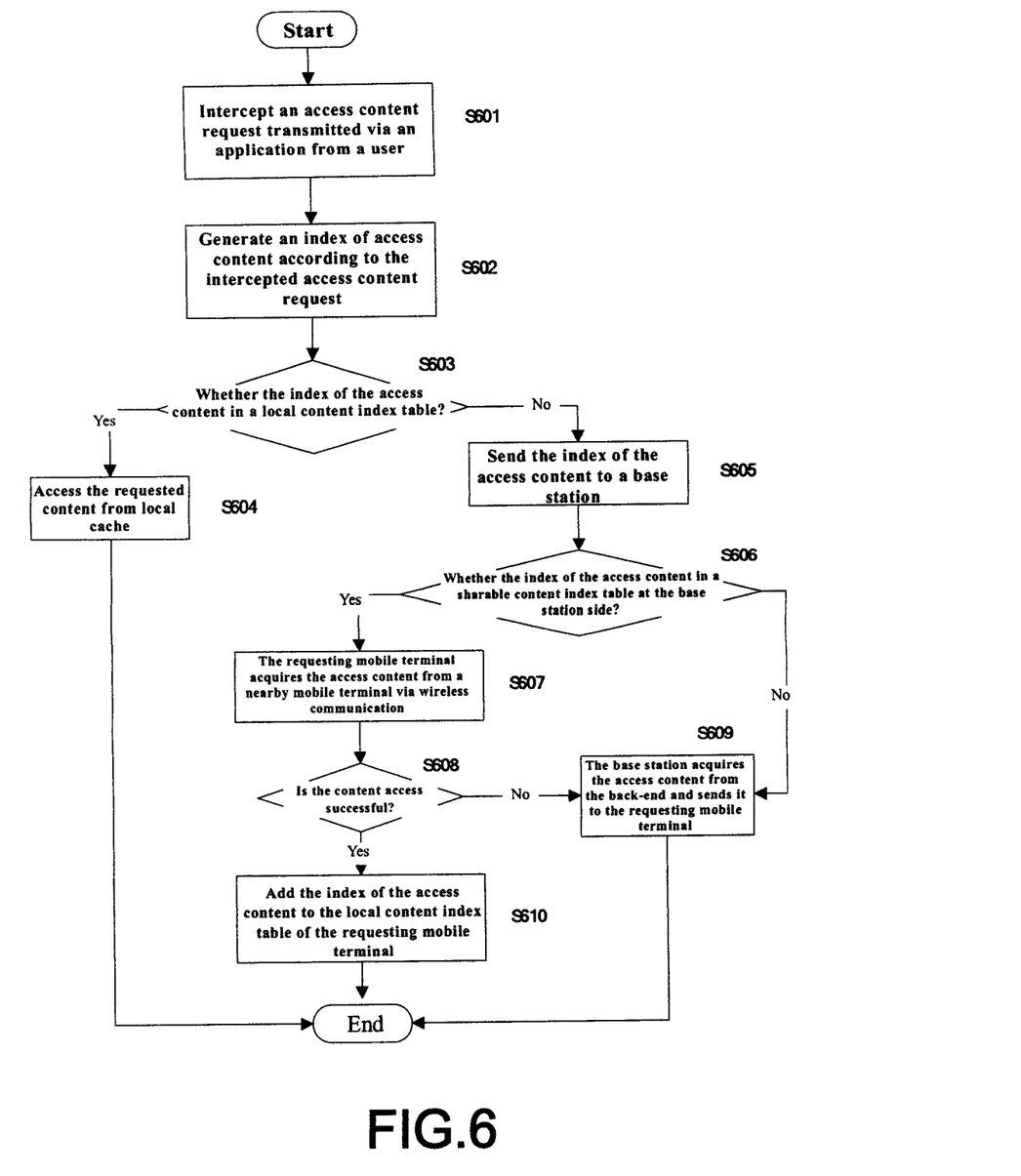
FIG. 6 shows a flowchart of a method for realizing content sharing among mobile terminals according to an embodiment of the present invention.

FIG. 6 shows a flowchart of a method for realizing content sharing among mobile terminals according to one embodiment of the present invention. At step S601, a content request interception module interfaced with an application is provided in the mobile terminal, to intercept an access content request transmitted through the application from a user. At step S602, an index of access content is generated according to the intercepted access content request. At step S603, it is determined whether the index of the access content is found in local content index table of the mobile terminal. If the judging result is "Yes", the mobile terminal accesses the requested content from local cache at step S604, and the process ends; and if the judging result is "No", the mobile terminal sends the index of the access content to a base station at step S605. It is determined whether the index of the access content is found in the shareable content index table at the base station side at step S606, and if the judging result is "No", the base station acquires the access content from the back-end via wired communication, and sends it to the mobile terminal that requests the access content, via Air Interface, at step S609, and the process ends. If the judging result is "Yes", the mobile terminal acquires the requested access content from a nearby mobile terminal having the index of the access content provided by the base station via short distance wireless communication at step S607. It is determined whether the content access succeeds at step S608, and if the judging result is "No", the base station acquires the access content from the back-end via wired communication, and sends it to the mobile terminal via Air Interface at step S609, and the process ends. If the judging result is "Yes", the index of the access content is added into the local content index table at step S610, and the process ends.

As for a telecommunication operator, many ways can be adopted to encourage mobile users to participate in a content sharing service, for example, the times for a mobile terminal to provide content sharing is accumulated as points, and the communication fee can be reduced to different extents according to the accumulated times.

It should be understood that at least some aspects of the present invention can be alternatively realized in program product. Programs defining the functions regarding the present invention can be transmitted to a data storage system or a computer system via various signal carrying medium including, but not limited to, unwritable storage medium (such as CD-ROM), writable storage medium (such as soft disk, hard disk driver, read/write CD ROM, optical medium), and communication medium such as computer including Ethernet and telephone network. Thus, it should be understood that such signal carrying medium can represent alternate embodiments of the present invention whey they carry or are encoded with computer readable instructions of managing method functions in the present invention. The present invention can be realized in hardware, software, firmware or a combination thereof. The present invention can be realized in a computer system in a concentrated way or in a distributed way in which different parts are distributed in several interconnected computer systems. Any computer system or other apparatus suitable for performing the methods described in the specification. Preferably, the present invention is realized in a manner of a combination of computer software and general computer hardware. In such a realizing manner, when the computer program is loaded and carried out, the computer system is controlled to perform the methods of the present invention or to constitute the system of the present invention.

The description of preferred embodiments of the present invention is given as above for purposes of illustration. The above explanations of preferred embodiments are not exhaustive, and are not intended to be limited to the present invention in the specific form disclosed, and obviously, many modifications and variations are possible in view of the above teaching. Such modifications and variations which are apparent to those of ordinary skill in the art are included in the scope of the present invention defined by the appended claims.

The invention claimed is:

1. A method for realizing content sharing among mobile terminals, comprising the steps of:
   receiving an index of access content sent by a requesting mobile terminal;
   looking up a shareable content index table for the index of the access content; and for each mobile terminals having the index of the access content found,
   receiving a wireless device status of the mobile terminals in the cell having the index of the access content, said received wireless device status comprising a position information of the mobile terminals having said index;
   judging, based on received position information of the mobile terminal, whether a distance between the mobile terminal having the index of the access content and the mobile terminal requesting to access content satisfies the distance requirement for wireless communication if the index of the access content is found; and
   sending identification information of the mobile terminal having the index of the access content to the requesting mobile terminal if the index of the access content is found and if the wireless device distance status of the mobile terminals having the index satisfies the distance requirement for wireless communication of the requested access content to the requesting mobile terminal, so that the requesting mobile terminal obtains the requested access content from the mobile terminal having the index of the access content via wireless communication.

2. The method according to claim 1, further comprising:
   periodically receiving indexes of local cache content reported from the mobile terminals in a cell; and
   combining the received indexes of local cache content to generate the shareable content index table.

3. The method according to claim 1, further comprising:
   determining the wireless device status of the mobile terminals by querying wireless device status of the mobile terminals having the index of the access content if the index of the access content is found.

4. The method according to claim 3, further comprising:
   periodically receiving a power consumption status reported from mobile terminals in the cell.

5. The method according to claim 4, wherein sending identification information of a mobile terminal having the index of the access content to the requesting mobile terminal if the index of the access content is found further comprises:
   judging whether power consumption status of the mobile terminals having the index of the access content satisfies a power consumption requirement for wirelessly communicating with the requesting mobile terminal if the index of the access content is found; and
   sending identification information of the mobile terminal having the index of the access content and satisfying the power consumption requirement to the requesting mobile terminal.

6. The method according to claim 3, further comprising:
   periodically receiving a load status reported from mobile terminals in the cell.

7. The method according to claim 6, further comprising:
   determining a wireless device status of the mobile terminal by querying the mobile terminal to obtain a load status of the mobile terminal having the index of the access content in a current time period if the index of the access content is found;
   determining the mobile terminal having the index of the access content and having a relatively lower load in the current time period; and
   sending identification information of the mobile terminal having the index of the access content and having a relatively lower load to the requesting mobile terminal.

8. A method for realizing content sharing among mobile terminals, comprising the steps of:
   intercepting an access content request transmitted via an application running on said mobile terminal from a user;
   generating, at the mobile terminal, an index of access content according to the intercepted access content request;
   looking up a local content index table provided in said mobile terminal for the index of the access content;
   sending the index of the access content to a base station if the index of the access content is not found in the local content index table; and
   receiving at said base station, a wireless device status of the mobile terminals having the index of the access content, said status comprising a position information reported from mobile terminals in the cell, and
   judge, based on received position information of the mobile terminal, whether a distance between the mobile terminal having the index of the access content and the mobile terminal requesting to access content satisfies the distance requirement for wireless communication if the index of the access content is found.

9. The method according to claim 8, further comprising:
   receiving identification information of the mobile terminal having the index of the access content from the base station; and
   obtaining the requested content from the mobile terminal having the index of the access content via wireless communication by using the identification information.

10. The method according to claim 9, wherein obtaining the requested content from the mobile terminal having the index of the access content via the wireless communication by using the identification information further comprising:
    adding the index of the access content to the local content index table.

11. An apparatus for realizing content sharing among mobile terminals, comprising:
    a memory storage device;
    a hardware processor in communication with said memory storage device, said processor configured to perform a method to:
       receive an index of access content sent by a requesting mobile terminal;
       look up a shareable content index table for the index of the access content; and for each mobile terminals having the index of the access content found,
       receive a wireless device status of the mobile terminals in the cell having the index of the access content, said received wireless device status comprising a position information of the mobile terminals having said index;
       judge, based on received position information of the mobile terminal, whether a distance between the mobile terminal having the index of the access content and the mobile terminal requesting to access content satisfies the distance requirement for wireless communication if the index of the access content is found; and
       send identification information of the mobile terminal having the index of the access content to the requesting mobile terminal if the index of the access content is found and if the wireless device distance status of the mobile terminals having the index satisfies the distance requirement for wireless communication of the requested access content to the requesting mobile terminal, so that the requesting mobile terminal obtains the requested access content from the mobile terminal having the index of the access content via wireless communication.

12. An apparatus for realizing content sharing among mobile terminals, comprising:
a memory storage device;
a hardware processor in communication with said memory storage device, said processor configured to perform a method to:
intercept an access content request transmitted via an application running on said mobile terminal from a user;
generate, at the mobile terminal, an index of access content according to the intercepted access content request;
look up a local content index table provided in said mobile terminal for the index of the access content;
send the index of the access content to a base station if the index of the access content is not found in the local content index table; and
receive at said base station, a wireless device status of the mobile terminals having the index of the access content, said status comprising a position information reported from mobile terminals in the cell, and
judge, based on received position information of the mobile terminal, whether a distance between the mobile terminal having the index of the access content and the mobile terminal requesting to access content satisfies the distance requirement for wireless communication if the index of the access content is found.

13. The apparatus according to claim 12, wherein said hardware processor is further configured to:
receive identification information of the mobile terminal having the index of the access content from the base station; and
obtain the requested content from the mobile terminal having the index of the access content via wireless communication by using the identification information.

14. The apparatus according to claim 11, wherein said hardware processor is further configured to:
query the mobile terminals for a wireless device status information having the index of the access content if the index of the access content is found, and send identification information of a mobile terminal whose wireless device status satisfies a requirement for wireless communication to the requesting mobile terminal.

15. The apparatus according to claim 11, wherein to determine a wireless device status of the mobile terminals having the index of the access content, said hardware processor is further configured to:
judge whether power consumption status of the mobile terminals having the index of the access content satisfies a power consumption requirement for wirelessly communicating with the requesting mobile terminal if the index of the access content is found; and
send identification information of the mobile terminal having the index of the access content and satisfying the power consumption requirement to the requesting mobile terminal.

16. The apparatus according to claim 11, wherein to determine a wireless device status of the mobile terminals having the index of the access content, said hardware processor is further configured to:
receive a load status reported from mobile terminals in the cell; and
determine a mobile terminal having the index of the access content and having a relatively lower load in a current time period, wherein said hardware processor is configured to send the identification information of the mobile terminal having the index of the access content and having a relatively lower load to the requesting mobile terminal.

* * * * *